United States Patent
Cannon et al.

(10) Patent No.: US 6,510,209 B1
(45) Date of Patent: *Jan. 21, 2003

(54) TELEPHONE ENABLING REMOTE PROGRAMMING OF A VIDEO RECORDING DEVICE

(75) Inventors: Joseph M. Cannon, Harleysville, PA (US); James A. Johanson, Emmaus, PA (US)

(73) Assignee: Lucent Technologies Inc., Murray Hill, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/045,182

(22) Filed: Mar. 20, 1998

(51) Int. Cl.⁷ .......................... H04M 1/64; H04M 1/56; H04M 11/00
(52) U.S. Cl. .................... 379/88.13; 379/67.1; 379/70; 379/88.17; 379/88.23; 379/102.03; 379/142.16
(58) Field of Search .......................... 379/67.1, 68, 70, 379/74, 77, 80, 82, 88.01, 88.03, 88.13, 88.17, 88.23, 88.24, 102.01–102.03, 93.25, 110.01, 142, 88.02, 93.09, 142.16, 908; 348/14, 15; 386/75, 83, 95, 96; 455/415, 420, 462, 412

(56) References Cited

U.S. PATENT DOCUMENTS

| | | | |
|---|---|---|---|
| 4,540,851 A | * 9/1985 | Hashimoto | 379/102 |
| 4,788,714 A | * 11/1988 | Hashimoto | 379/74 |
| 4,805,206 A | * 2/1989 | Beom-Chae | 379/77 |
| 4,829,555 A | * 5/1989 | Hashimoto | 379/70 |
| 5,025,324 A | * 6/1991 | Hashimoto | 386/54 |
| 5,086,385 A | * 2/1992 | Launey et al. | 364/188 |
| 5,189,691 A | * 2/1993 | Dunlap | 379/70 |
| 5,321,737 A | * 6/1994 | Patsiokas | 379/58 |
| 5,550,754 A | * 8/1996 | McNelley et al. | 348/14 |
| 5,621,456 A | * 4/1997 | Florin et al. | 348/7 |
| 5,682,599 A | * 10/1997 | Yoshinobu | 455/5.14 |
| 5,721,767 A | * 2/1998 | Bae | 379/102.3 |
| 5,905,843 A | * 5/1999 | Kim et al. | 386/83 |
| 5,970,206 A | * 10/1999 | Yuen et al. | 386/83 |
| 6,011,579 A | * 1/2000 | Newlin | 348/15 |
| 6,061,435 A | * 5/2000 | Grundvig et al. | 379/102.03 |

* cited by examiner

*Primary Examiner*—Allan Hoosain

(57) ABSTRACT

A user can program the user's VCR when away from home by calling the user's home telephone number and remotely interacting with the user's telephone which is adapted for programming the VCR in accordance with the invention. A telephone answering device according to the invention thus includes an incoming call signal decoder adapted to decode a signal contained within an incoming call, and an output device adapted to output a control signal to a remotely controlled device in response to the decoded signal. In an alternative embodiment, a method of programming a video recording device includes steps of calling, from a telephone at a remote location, to a telephone answering device; and providing a programming signal to the telephone answering device, wherein the telephone answering device responds to the programming signal to program the video recording device.

17 Claims, 2 Drawing Sheets

TELEPHONE ENABLING REMOTE PROGRAMMING OF A VIDEO RECORDING DEVICE

CROSS-REFERENCE TO RELATED APPLICATION

This application is related to co-pending application Ser. No. 08/944,535, entitled "Cordless Telephone System Having a Handset With Non-telephone Functionality," filed on Oct. 3, 1997, incorporated herein by reference.

FIELD OF THE INVENTION

This invention is related to the field of electronically controlled devices, and more particularly to a video recording device.

BACKGROUND OF THE INVENTION

A video cassette recorder (VCR) is typically coupled to an incoming cable service port and to a television set. A conventional VCR provides a user with the ability to perform two major functions: recording incoming television programs from the cable service port and playing videotapes for viewing on the television. The videotapes that are played can be, for example, tapes of television shows previously recorded by the VCR, professionally produced movies purchased or rented by the user, or recorded tapes produced by the user on a camcorder.

A feature typically available on a VCR provides its user with the ability to program the VCR to record a television show at a future date and time. Further, some VCRs can be programmed to record at regular intervals, such as at the same time each week in order to record the user's favorite television show. For example, a user can program such a VCR to record the television show appearing on channel 4 each Thursday from 9:00 p.m. to 10:00 p.m. This feature, when utilized, relieves the user of the burden of programming the VCR each week.

Each of the above described VCR features is programmed by the user when the user is in proximity to the VCR. For example, the user can program the VCR by pressing buttons on the VCR. Alternatively, the user can program the VCR by pointing a remote control device at the VCR while following a script appearing on an accompanying television set. A conventional VCR, however, does not provide the user with the ability to program the VCR when the user is not proximate thereto.

For example, if the user of the VCR is away from home when the user remembers that the user forgot to program the VCR to record a particular program, the user may then attempt to get home in time to program the VCR, or may elect to miss out on the user's favorite program this week. In another example, a user may be at someone else's house for a party, and may realize that the noise and activity of the party are preventing the user from seeing an important show or sporting event. If the user's VCR is not previously programmed to record the important show, the user has a choice of leaving the party to watch the show and/or program the user's VCR, or to miss the important show. In yet another example, a user may be away from home when the user remembers that the user left an important tape in the user's VCR, and that the VCR is programmed to record an upcoming show. According to this scenario, the user's VCR may record over the important tape unless the user can get home in time to reprogram the VCR. In each of these scenarios, the user can benefit from the ability to program the user's VCR when the user is not proximate to the user's VCR, such as when the user is not at home.

SUMMARY OF THE INVENTION

According to the invention, a user can program the user's VCR when away from home by calling the user's home telephone number and remotely interacting with a telephone answering device which is adapted for programming the VCR in accordance with the invention. A telephone answering device according to the invention thus includes an incoming call signal decoder adapted to decode a signal contained within an incoming call, and an output device adapted to output a control signal to a remotely controlled device in response to the decoded signal. In an alternative embodiment, a method of programming a video recording device includes steps of calling, from a telephone at a remote location, to a telephone answering device, and providing a programming signal to the telephone answering device, wherein the telephone answering device responds to the programming signal to program the video recording device.

BRIEF DESCRIPTION OF THE DRAWINGS

These and other aspects of the invention will be apparent from the following detailed description when read in conjunction with the accompanying drawings, in which.

DETAILED DESCRIPTION

The co-pending application describes a cordless telephone having a base unit and a handset, wherein at least one of the base unit and the handset is adapted to control a remotely controllable device, such as a television, a stereo, or a video cassette recorder (VCR). For example, when an incoming call is received, the co-pending application describes the transmission of a signal from either the base unit or the handset to a television via an infrared link, an RF link, or a wired connection, such as a connection via a 60 Hz power grid. The signal can control the television to mute upon receipt of the incoming call, to display caller ID data, to display parallel set status, etc.

Instead of, or in addition to, controlling the television in response to an incoming call, the co-pending application also describes controlling a video recording device, such as a VCR, as well as the control of other audio-visual equipment. For example, if a VCR or videodisk player is in the process of playing a movie at the time the incoming call is received, the VCR or videodisk player can be paused or stopped in concert with the muting of the television and/or the display of the caller ID data on the television screen. This enables a television viewer to accept the incoming call without missing a portion of the movie, and without requiring the viewer to rewind and/or search for the point of interruption after completing the telephone conversation.

Figure 1:
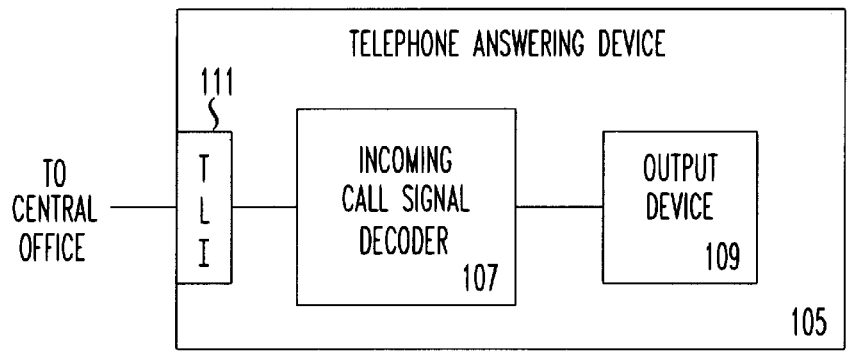
FIG. 1 is a simplified block diagram of a telephone answering device according to the invention.

In addition to controlling a video device while the video device is playing a movie, it is possible to control the video device from a remote location according to the invention. For example, the simplified block diagram of FIG. 1 shows a telephone answering device 105 including an incoming call signal decoder 107 adapted to decode a signal contained within an incoming call, and an output device 109 adapted to output a control signal to a remotely controlled device in response to the decoded signal. The incoming call signal decoder 107 receives the incoming call, for example, from a telephone line interface 111 which is coupled to a central office of a public switched telephone network (PSTN), not shown.

Output device 109 may take the form of an infrared device and be configured to output an infrared signal as the control signal. Alternatively, output device 109 may take the form of an RF device and antenna and be configured to output an RF signal as the control signal. Still further, output device 109 may include a line driver configured to output a signal on a control line. Infrared signaling, RF signaling, and line communication are all well known to one of ordinary skill in the art, and need not be described further herein.

Figure 2:
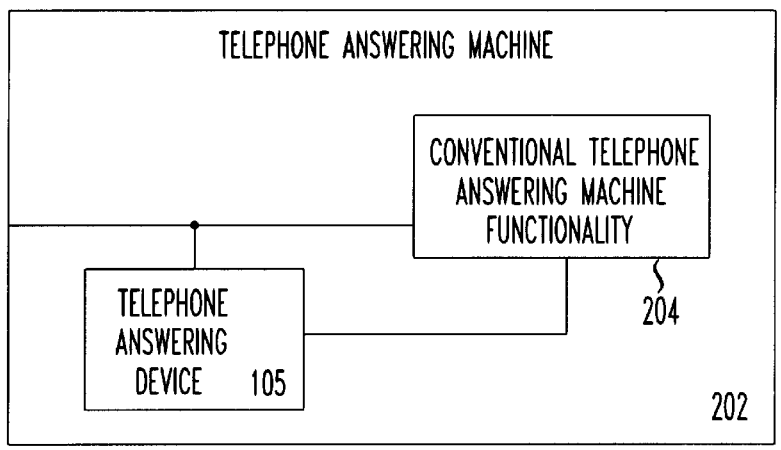
FIG. 2 is a simplified block diagram of a telephone answering machine incorporating the telephone answering device of FIG. 1.

Telephone answering device 105 may be part of a system that performs additional functions beyond those described herein. For example, FIG. 2 shows telephone answering device 105 incorporated into a telephone answering machine 202, including conventional telephone answering machine functionality 204 adapted to record and play back incoming calls. In this embodiment, incoming call signal decoder 107 is adapted to decode an incoming signal, such as a dual tone multi-frequency (DTMF) signal, or a voice command signal, and to recognize this incoming signal as a user input code when the signal matches predetermined criteria. Absent the receipt of the predetermined user input code, the conventional telephone answering machine functionality 204 will operate in a conventional manner. When a user wishes to program or reprogram the user's video recording device, on the other hand, the user merely enters the predetermined code by, for example, entering the corresponding DTMF sequence, for example during or in response to an outgoing message, and after signal decoder 107 recognizes the code, the telephone answering device 105 enters a video programming mode.

The incoming call signal decoder 107 and conventional telephone answering machine functionality 204 may be realized as one or more integrated circuit devices. For example, they may collectively be realized within a single processor, such as a digital signal processor (DSP). Of course, they may each be realizable as parts of separate processors or DSPs specially adapted to carry out the specific functions described herein, or of a general purpose nature and adapted to carry out many functions, including those described herein.

When the user wishes to program the user's VCR via telephone answering device 105, for example, as an incoming caller calling in from a remote location, the incoming caller dials the appropriate telephone number to establish a connection with telephone answering machine 202. In one embodiment, while listening to the outgoing message, the incoming caller initiates a DTMF sequence (by pressing corresponding keys on the incoming telephone) that is recognized by incoming call signal decoder 107. Telephone answering device 105 enters the video programming mode when the predetermined code is recognized and thus issues one or more voice prompts to the incoming caller. The incoming caller responds to the voice prompts by providing additional DTMF signals indicating the incoming caller's programming selection. Output device 109 generates and outputs control signals consistent with the selected programming selection.

For example, the incoming caller may provide DTMF signals corresponding to a VCR-Plus code. VCR-Plus is a programming standard whereby each program is associated with a unique code number, such as a six-digit number. The standard was developed to make it easier for VCR owners to program their VCRs. Instead of entering the date, time and channel the user wishes to record, the user merely enters the VCR-plus number associated with the program, which can be found in a television viewing guide, and the VCR has the ability to interpret the VCR-plus number and program itself accordingly. The present invention is ideally suited for a VCR that has VCR-plus capability, since the incoming caller, for example in response to a voice prompt from the incoming call signal decoder 107, can initiate programming of the VCR by merely pressing keys on the remote telephone corresponding to the VCR-plus number to create corresponding DTMF signals that are readable by the incoming call signal decoder 107.

The voice prompts may form part of a script stored in a memory. Also, a portion of the memory may be available for storing the incoming caller's selections (DTMF signals). Advantageously, the memory used for these functions may be the same memory that is used by the conventional telephone answering machine functionality 204 to accomplish conventional telephone answering machine functions. For example, the memory may be associated with or incorporated into a DSP that encompasses the conventional telephone answering machine functionality.

Instead of communicating via DTMF signals, the telephone answering device 105 may be equipped with a voice recognition module adapted to respond to voice commands issued by the incoming caller. The voice recognition module may be realized as part of the same DSP as the incoming call signal decoder 107 and the conventional telephone answering machine functionality 204, or as a separate processor or DSP.

Figure 3:
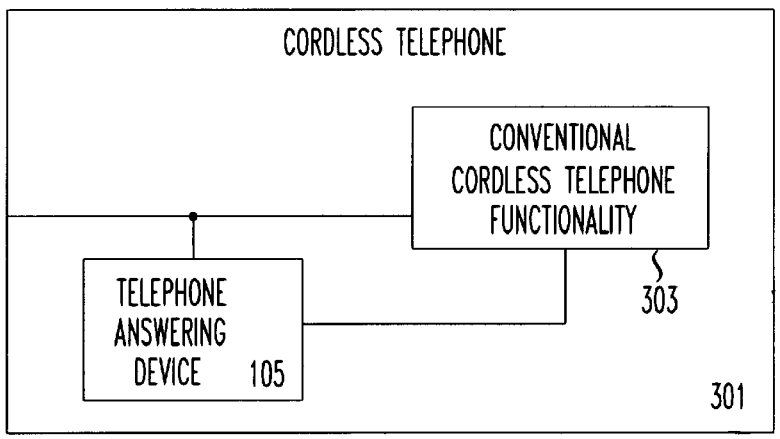
FIG. 3 is a simplified block diagram of a cordless telephone incorporating the telephone answering device of FIG. 1.

Instead of being incorporated into a telephone answering machine, FIG. 3 shows telephone answering device 105 incorporated into a cordless telephone 301, such as in a base unit thereof. As such, cordless telephone 301 includes conventional cordless telephone functionality 303, which functions unless a predetermined DTMF sequence is recognized by incoming call signal decoder 107. If the predetermined DTMF sequence is recognized by incoming call signal decoder 107, then the incoming call signal decoder 107 communicates with the incoming caller to determine the ways in which the incoming caller wants to affect the VCR.

The output device portion 109 of the telephone answering device 105 within the cordless telephone 301 may be, for example, an infrared signaling unit or a radio frequency (RF) signaling unit. If, for example, the output device 109 is an RF signaling unit, then in one embodiment the output device 109 shares physical attributes with an RF signaling unit established for conventional cordless telephone functions. For example, an antenna of a base unit of cordless telephone 301 that is used to communicate between the base unit and a handset of cordless telephone 301 may also be used to communicate between the cordless telephone 301 and a VCR for VCR control purposes. Other conventional RF components, such as transmitters and receivers, may also be shared for both cordless telephone communication purposes and for VCR control purposes. Preferably, the cordless telephone transmissions from such shared elements are at a first frequency, or within a first frequency band, while the VCR control transmissions are at a second frequency or within a second frequency band.

The aforementioned embodiments describe telephone answering device 105 within an answering machine in one embodiment and within a cordless telephone in another embodiment. Of course, telephone answering device 105 may be realized within an apparatus that is a combination answering machine and cordless telephone, or within a higher level apparatus that includes answering machine functionality, cordless telephone functionality and/or any other functionality, such as facsimile or computing functionality. Also, telephone answering device 105 may be a stand alone unit having no functionality other than to program a video device according to the invention, or may be incorporated into a video device.

Figure 4:
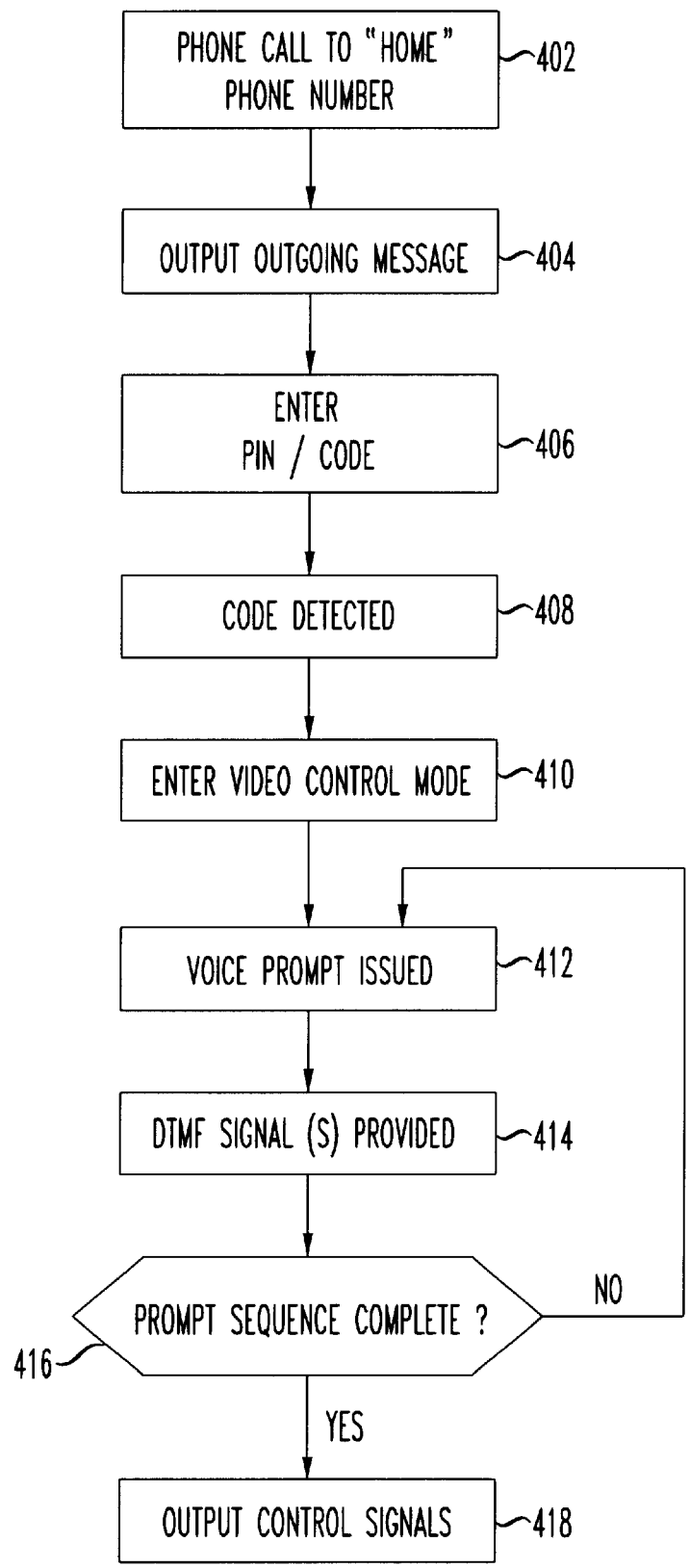
FIG. 4 is a flowchart of an exemplary method of programming a VCR from a remote location according to the invention.

FIG. 4 is a flowchart showing a method of controlling a VCR or other video device by way of a telephone answering device 105 according to the invention. For purposes of this flowchart, it will be presumed that telephone answering device 105 is incorporated into a telephone answering machine such as telephone answering machine 202 of FIG. 2, or into a higher level system that includes telephone answering machine functionality.

At step 402, an incoming caller places a telephone call from a remote location to a telephone number corresponding to telephone answering machine 202. For example, a user calls the user's home telephone number from another location, and engages telephone answering machine 202. Although referred to as the "home" telephone number, it is understood that the telephone number can be for a location other than the user's home location—the important aspect being that the telephone number is associated with a location proximate to a target video device.

At step 404, after a predetermined number of rings, conventional telephone answering machine functionality 204 of telephone answering machine 202 outputs an outgoing message (OGM) to the incoming caller (user). The incoming caller enters a code, such as a personal identification number (PIN), at step 406, by pressing corresponding keys on the remote telephone to create DTMF signals. At step 408, the DTMF code is detected by incoming call signal decoder 107. At step 410, incoming call signal decoder 107 enters a video control mode if the DTMF code matches a predetermined DTMF code corresponding to the video control function.

At step 412, a voice prompt is issued by decoder 107, or by another part of telephone answering device 105, to prompt the incoming caller for additional information. At step 414, the incoming caller responds to the voice prompt by providing one or more DTMF signals by pressing corresponding keys on the remote telephone. For example, the incoming caller may enter a VCR-Plus number associated with a program to be recorded. Steps 412 and 414 are repeated until a voice prompt sequence is completed, as determined at step 416, after which output device 109 outputs one or more control signals at step 418 to control the target video device.

For example, if a VCR owner is away from home and realizes that the VCR owner's VCR should be programmed to record an upcoming television show, the VCR owner can place an incoming call to the VCR owner's home telephone number. The standard telephone answering machine functionality issues an OGM to the incoming caller (VCR owner). During the OGM, or after the OGM is played, or at any other time during the call (such as after the incoming caller leaves a message for the incoming caller's spouse/roommate), the incoming caller can press keys on the remote phone to enter a DTMF code to begin the VCR control process, and can press additional buttons to respond to a voice prompt script issued by the telephone answering device 105. When the telephone answering device 105 knows the desires of the incoming caller, it can issue control signals via the output device 109.

In an open loop embodiment, the telephone answering device 105 is now finished with this task, and awaits additional instructions if/when a subsequent incoming call requests VCR programming. Alternatively, in a closed loop embodiment, telephone answering device 105 waits for an acknowledge signal from the VCR before characterizing the task as complete. If the acknowledge signal is not received within a predetermined period of time, the telephone answering device 105 can reissue the control signals. In such an embodiment, for example, output device 109 may operate as an input/output device to send and receive signals to and from the VCR.

In a still further alternative, the incoming caller may be part of a closed loop control process, whereby the VCR issues prompts to the telephone answering device 105, which converts these prompts to voice prompts for issuance to the incoming caller. When the incoming caller responds, the telephone answering device 105 issues corresponding control signals to the VCR via output device 109. Through such a process, the VCR can follow a programming script.

The process shown in FIG. 4 relies on user initiation of DTMF signals by pressing corresponding keys on the remote telephone. Alternatively, telephone answering device 105 may be equipped with a voice recognition module adapted to recognize and respond to voice commands provided by the incoming caller. For example, instead of looking for a specific DTMF code, incoming call signal decoder 107 can listen for a predetermined statement, such as "VCR" to cause it to initiate the programming sequence. Thus, the programming of the VCR, from the user's perspective, may comprise listening to a series of voice prompts and verbally responding thereto.

It is understood that the above-described embodiments are merely illustrative of the invention, and that numerous other arrangements may be devised by those skilled in the art without departing from the spirit and scope of the invention.

What is claimed is:

1. A telephone answering device, comprising:
   an incoming call signal decoder adapted to decode a signal from a user contained within an incoming call; and
   a wireless output device adapted to output a wireless control signal to a wirelessly, remotely controlled device in response to the decoded signal, the wirelessly, remotely controlled device being positioned remotely from the output device.

2. A telephone answering device as recited in claim 1, wherein the wirelessly, remotely controlled device is a video device.

3. A telephone answering device as recited in claim 2, wherein the video device is a video cassette recorder (VCR).

4. A telephone answering device as recited in claim 3, wherein the wireless control signal programs the VCR to record a television show.

5. A telephone answering device as recited in claim 4, wherein the wireless control signal programs to record the television show at a future time.

6. A telephone answering device as recited in claim 1, wherein the wirelessly, remotely controlled device is a video cassette recorder (VCR) and the control signal programs the VCR to not record a previously programmed television show.

7. A telephone answering device as recited in claim 1, wherein the wireless output device comprises an infrared device, and wherein the wireless control signal is an infrared signal.

8. A telephone answering device as recited in claim 1, wherein the wireless output device comprises a radio frequency (RF) unit, and wherein the wireless control signal is an RF signal.

9. A telephone answering device as recited in claim 8, wherein the telephone answering device further comprises a cordless telephone, and wherein the RF unit comprises an RF transmitter and an antenna as part of a cordless telephone base unit.

10. A telephone answering device as recited in claim 1, wherein the incoming call signal decoder is adapted to recognize and decode a voice command as the signal contained within the incoming call.

11. A system, comprising:
- a telephone answering device, adapted to receive an incoming call, to decode a signal from a user contained within the incoming call, and to output a wireless control signal in response to the decoded signal; and
- a video recording device positioned remotely from the telephone answering device and adapted to receive the wireless control signal and to adjust a recording plan in response to the wireless control signal.

12. A system as recited in claim 11, wherein the telephone answering device is adapted to produce the wireless control signal as an infrared signal, and wherein the video recording device is adapted to receive the infrared signal.

13. A system as recited in claim 11, wherein the telephone answering device is adapted to produce the wireless control signal as a radio frequency (RF) signal, and wherein the video recording device is adapted to receive the RF signal.

14. A system as recited in claim 13, wherein the telephone answering device comprises a cordless telephone, including a cordless base unit, and wherein the cordless base unit is adapted to use a same RF transmission antenna for transmitting the RF signal to the video recording device and to transmit telephony information to a cordless handset.

15. A method of programming a video recording device, comprising the steps of:
- calling, from a telephone at a remote location, to a telephone answering device positioned remotely from the video recording device; and
- providing a programming signal from the telephone at the remote location to the telephone answering device; and
- preparing a wireless signal for wireless transmission from the telephone answering device to the video recording device;
- wherein the telephone answering device responds to the programming signal to program the video recording device.

16. A method as recited in claim 15, wherein the step of preparing a wireless signal comprises preparing an infrared signal for transmission to the video recording device.

17. A method as recited in claim 15, wherein the step of preparing a wireless signal comprises preparing a radio frequency (RF) signal for transmission to the video recording device.

* * * * *

UNITED STATES PATENT AND TRADEMARK OFFICE
CERTIFICATE OF CORRECTION

PATENT NO.   : 6,510,209 B1
DATED        : January 21, 2003
INVENTOR(S)  : Joseph M. Cannon et al.

It is certified that error appears in the above-identified patent and that said Letters Patent is hereby corrected as shown below:

<u>Title page,</u>
Item [73], Assignee, should be -- Agere Systems Inc. --

Signed and Sealed this

Third Day of June, 2003

JAMES E. ROGAN
*Director of the United States Patent and Trademark Office*